United States Patent Office 3,233,409
Patented Feb. 8, 1966

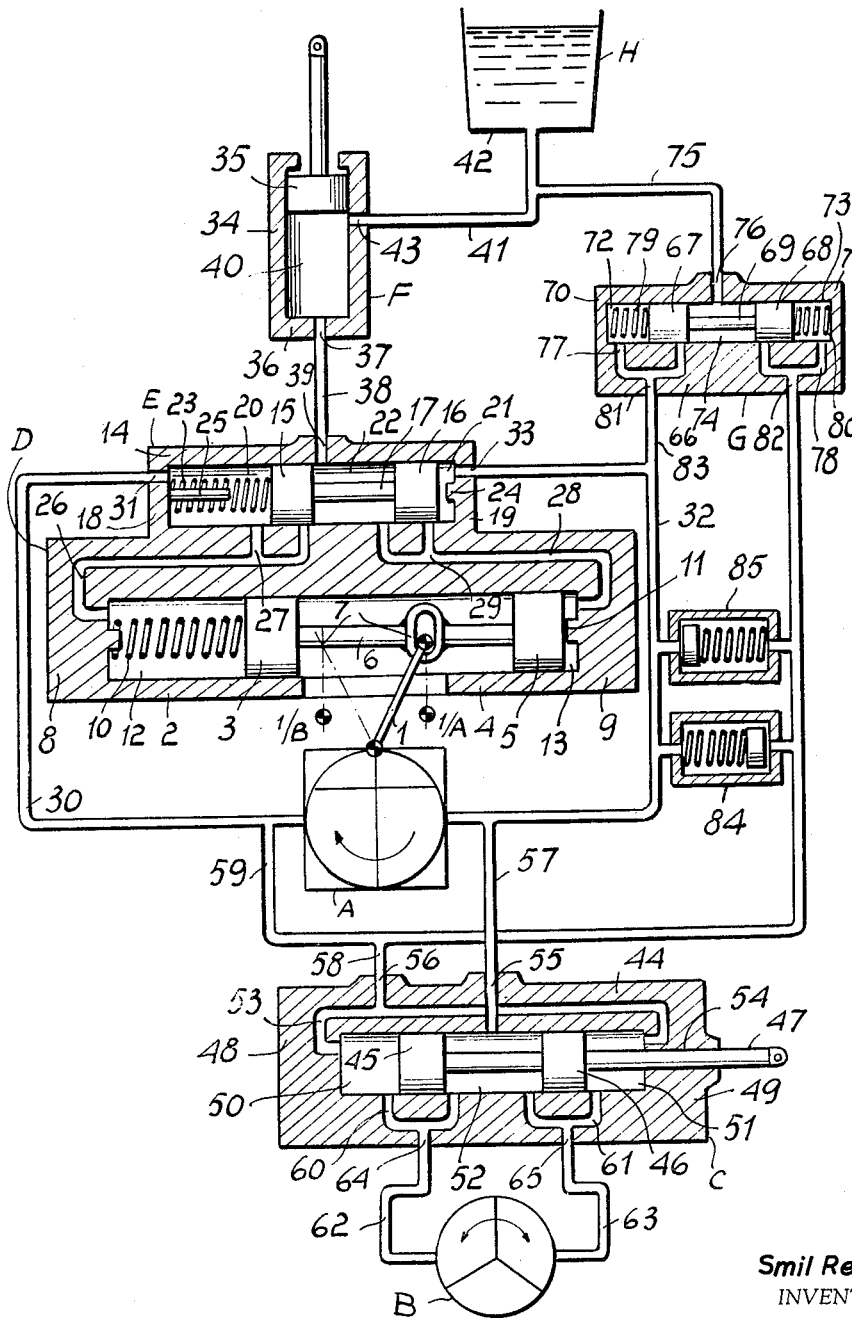

3,233,409
REVERSIBLE HYDRAULIC TRANSMISSION WITH A SELF-CHANGING TRANSMISSION RATIO
Smil Reis, Viale Compania 29, Milan, Italy
Filed Dec. 1, 1964, Ser. No. 415,093
Claims priority, application Italy, Dec. 13, 1963, 25,734/63
7 Claims. (Cl. 60—52)

This invention relates to a fluid-pressure-operated assembly forming a reversible transmission with a self-changing transmission ratio, the assembly comprising:

A hydraulic motor;

A variable delivery pump for supplying a pressure fluid to said hydraulic motor;

A hand-operated distributor device for directing said pressure fluid to said hydraulic motor so that the transmission is selectively in its drive, neutral or reverse operating states;

Pipe connections for the flow of the pressure fluid between said hydraulic motor, said distributor device and said pump;

A double-acting cylinder arrangement for displacing a control member of said pump, whereby the amount of delivery of the pump, and consequently the transmission ratio, is changed, said cylinder arrangement being operated by the pressure fluid supplied by the pump when said pump tends to speed up in respect to the hydraulic motor, and by the pressure fluid returned from said hydraulic motor to said pump, when the pump tends to slow down in respect to said motor, so that the transmission is reversible, the transmitted motion remaining unaffected when the drive from the pump to the hydraulic motor is reversed, i.e. from said motor to the pump;

A second distributor device operated alternatively by said pressure fluid from the pump, or returning from the hydraulic motor to the pump, for admitting said pressure fluid to said cylinder arrangement, and for admitting at the same time, a second pressure fluid to said cylinder arrangement, in opposition to said pressure fluid issuing from or returning to said pump;

Pipe connections for the flow of said pressure fluid from said pump and said hydraulic motor to said second distributor device and ducts for the flow of said pressure fluid from said distributor device to said double-acting cylinder arrangement;

A cylinder with a single-acting piston operated in dependence upon the pump speed, for forcing said second pressure fluid into said double-acting cylinder arrangement through said second distributor device, so that the position of said control member of the pump is always that at which fluid pressures from said pump or from the hydraulic motor, and from said single acting cylinder, are in balance with each other, and conseqeuntly, the transmission ratio is in accordance with the load and with the speed of the pump; and A pipe connection for the flow of said second pressure fluid between said single-acting cylinder and said second distributor device.

The invention comprises further:

A container for the pressure fluid;

A third distributor device operated by the pressure fluid from said pump or from said hydraulic motor for admitting fluid from said container into that pipe connection for the flow of fluid from and to the pump, which is relieved of pressure, and A pipe connection between said container and said single-acting cylinder for admitting fluid from said container into said second cylinder with the single-acting piston, when the latter is at the outer end of its stroke.

The invention comprises still further:

Valve arrangements between said pipes for the flow of fluid from and to the pump, for preventing buildup of excess pressures in said pipes and the whole hydraulic assembly.

It is understood, that a plurality of hydraulic motors instead of the mentioned single hydraulic motor in the transmission, does not change anything of the substance of the invention.

For the clear understanding of its substance, the invention is hereinafter described in more detail with reference to the appended drawing, the sole figure of which shows schematically the transmission assembly, its essential parts, devices and the connections therebetween.

As shown in the drawing, the transmission assembly comprises a variable delivery pump A; a hydraulic motor B; a hand-operated distributor device C for selectively setting the transmission in its drive, neutral or reverse operating states; a double-acting cylinder arrangement D with a second distributor device E, operated by the pressure fluid for effecting the adjustment of the transmission ratio and for securing reversibility of the assembly when the load becomes the driving force instead of being driven, as happens when the pump, after speeding up, slows down in respect to the hydraulic motor; a cylinder F with a single-acting piston operated in dependence upon the pump speed for forcing a second pressure fluid to balance the action of the pressure fluid in the double-acting cylinder arrangement D; and a third distributor device G with a container H, for keeping the assembly constantly filled with pressure fluid.

The pump A has a control member 1 movable between two positions 1/A and 1/B corresponding to a variation of the pump delivery rate respectively from zero to a maximum. The control member 1 is operated by the double-acting cylinder arrangement D which comprises a first cylinder 2 with a first piston 3 on one side of said control member 1, and a second cylinder 4 with a second piston 5, on the opposite side of the control member 1. The pistons 3 and 5 are fixed to the ends of an intermediate rod 6 with a slot 7, in which the end of the control member 1 is engaged. In this way, when the piston unit 3–5 travels between the ends of its stroke, the control member 1 is moved between its end positions 1/A and 1/B, corresponding to the different rates of delivery of the pump between zero and the maximum.

The cylinders 2 and 4 are closed at their outward ends by the respective cylinder heads 8 and 9. A spring 10, seated against the cylinder head 8, urges the piston unit 3–5 toward a stop 11 of the opposite cylinder head 9, so that the control member is biased toward its end position 1/A where the pump delivery is zero. Between the piston 3 and the cylinder head 8 remains therefore a first chamber 12, while between the piston 5 and the cylinder head 9 there is formed a second chamber 13.

The cylinders 2 and 4 are associated with the distributor device E, which itself comprises a cylinder 14 with a first piston 15 and a second piston 16 fixed to the ends of an intermediate rod 17 and forming a piston unit 15–16. The cylinder 14 is closed at its opposite ends by the cylinder heads 18, 19, so that between the cylinder head 18 and the first piston 15 there is formed a first chamber 20; between the second piston 16 and the cylinder head 19 there is left a second chamber 21; and between the pistons 15 and 16 around the rod 17, there is an intermediate chamber 22. A spring 23 bearing against the cylinder head 18 of the cylinder 14, urges the piston unit 15–16 toward a stop 24 of the opposite cylinder head 19. A further stop 25 of the cylinder head 18 limits the stroke of the piston unit 15–16 to the left.

A first duct 26 having one end opening into the chamber 12 of the cylinder 2, has its other end communicating with the bore of the cylinder 14 at a point where it remains obstructed by the piston 15 when the piston unit is at rest against the stop 24. A branch 27 of the duct 26 opens a communication between the chamber 20 of the cylinder 14 and said duct 26. A second duct 28 between the chamber 13 of the cylinder 4 and the chamber 22 of the cylinder 14 has a branch opening into the bore of the cylinder 14 at a point where it is obstructed by the piston 16 when the piston unit 15–16 is at rest at the stop 24. Thus, when the piston unit 15–16 is at rest at the stop 24, there is an open passage between the chamber 12 of the cylinder 2 and the chamber 20 of the cylinder 14, and at the same time, there is a communication between the chamber 13 and the chamber 22, respectively of the cylinders 2 and 14. When instead, the piston unit 15–16 is at rest against the stop 25, communication is opened between the chambers 12 and 22 on one side, and 13 and 21, on the other side.

The chamber 20 is connected to the delivery pipe 30 of the pump A through a port 31 in the cylinder head 18, while the chamber 21 is connected to the return pipe 32 of the pump A through a port 33 in the cylinder head 19. The distributor device E is therefore operated by the pressure fluid of the delivery pipe 30 and return pipe 31, which thus operates also the piston unit 3–5 through the ducts 26 and 28, thereby permitting the adjustment of the transmission ratio in dependence upon the fluid pressure inside pipes 30, 32.

The device F, further connected to the distributor device E, comprises a single-acting cylinder 34 with a piston 35 operated by a mechanism not shown in the drawing and well known, which urges said piston 35 in dependence upon the pump speed. The cylinder 34 has a cylinder head 36 with a port 37 connected to one end of a pipe 38 while the other end is connected to a port 39 opening into the chamber 22 of the cylinder 14 of the distributor device E. Thus, the chamber 40 between the piston 35 and the cylinder head 36 is in constant communication with said chamber 22 of the distributor device E, so that fluid from said cylinder 34 can be forced by the piston 35 through the chamber 22 into the chamber 13 or the chamber 12, according to the position of the piston unit 3–5, itself depending upon the prevailing pressure within the pipes 30 and 32, whereby the fluid from said cylinder 34 will always act on the piston of the unit 3–5 which is opposed to that piston of the same unit, on which the prevailing pressure from one of the pipes 30, 32 is active; this is due to the fact that while the piston unit 15–16 of the distributor device E opens the flow from the duct 30 into the chambers 23 and 12, the communication between the chambers 40 and 22 with the chamber 13 remains open, and vice-versa, when the duct 32 is opened into the chambers 13 and 21, the chambers 40 and 22 are brought in communication with the chamber 12.

When the pump A is idle, as will be seen below, there is no pressure inside the pipes 30 and 32 and the pressure transmitted by the piston 35 urges the piston unit 3–5 against the spring 10, tending to increase the pump delivery.

The chamber 40 of the device F is filled with fluid from a container H through a pipe 41 between the bottom 42 of said container and a port 43 opening into the bore of the cylinder 34 at a point where it will be obstructed by the piston 35 as soon as said piston starts moving towards the cylinder head 36 so as to prevent any reflux of fluid back to the container H.

The hand-operated distributor C for selecting the drive, neutral or reverse condition, comprises a cylinder 44 with a piston unit 45–46, the pistons 45 and 46 of the unit being fixed to a rod 47 at a distance from each other; the cylinder 44 has its ends closed by cylinder heads 48 and 49 and the piston unit 45–46 defines in its bore, three chambers 50, 51 and 52 respectively between the piston 45 and the cylinder head 48, between the piston 46 and the cylinder head 49, and between said pistons 45 and 46. The chambers 50 and 51 are in permanent communication with each other through a duct 53. The rod 47 projects, at one side of the piston unit 45–46, outwardly from the cylinder 44 through a hole 54 of the cylinder head 49, so that the rod can be grasped for shifting the piston unit 45–46. A port 55 of the cylinder 44 opens into the chamber 52 while a second port 56 opens into the duct 53. A branch 57 of the return pipe 32 is connected to the port 55, while a pipe 58 connects the port 56 to a branch 59 of the delivery pipe 30, so that the chamber 52 is in communication with the pipe 32 for the flow of the pressure fluid back to the pump A, while the chambers 50 and 51 are in communication with the delivery pipe 30 of said pump A for the flow of pressure fluid from said pump A to said chambers 50 and 51.

A U-shaped duct 60 opens at its ends on each side of the piston 45 into the chambers 50 and 52, when the piston unit 45–46 is in its mean "neutral" position. A second U-shaped duct 61, opens its ends at each side of the piston 46 into the chambers 52 and 51. Two pipes 62 and 63 connected to the ports 64 and 65 of the cylinder 44 opening respectively into the U-shaped ducts 60 and 61, are connected by their other ends, respectively to the admission ports and the exhaust ports of the hydraulic motor B. Thus, when the piston unit 45–46 is in its "neutral" position, as shown by the drawing, all the chambers 50, 51 and 52 of the cylinder 44 are intercommunicating and consequently, the pump A and the hydraulic motor B are each shunted, and therefore, idle, while with the piston unit 45–46 shifted in the direction of the cylinder head 49, the pipe 62 will be connected to the pump delivery through chamber 50, duct 53, port 56, pipe 58, branch 59 and pipe 30 and the pipe 63 will return the flow of fluid to the pump A. With the piston unit shifted to the opposite cylinder head 48, the flow from the pump to the hydraulic motor will go through the pipe 63, and the flow back from the hydraulic motor to the pump will go through the pipe 62. The inversion of the rotation of the hydraulic motor B will thus be obtained by shifting the rod 47 and the piston unit 45–46 from one to the other cylinder head 48–49.

The third distributor device G for admitting fluid from the container H comprises a cylinder 66 with a piston unit 67–68 fixed to the ends of an intermediate rod 69. The cylinder 66 has two cylinder heads 70 and 71 at its ends. Three chambers 72, 73 and 74 are defined in the bore of said cylinder 66, respectively between the cylinder head 70 and the piston 67, between the piston 68 and the cylinder head 71, and between the pistons 67 and 68 around the rod 69. A branch 75 of the pipe 41 has its free end connected to a port 76 of the cylinder 66, so that it opens into the intermediate chamber 74. Thus the chamber 74 is in constant communication with the container H. A U-shaped duct 77 opens by one of its ends into the chamber 72 and by its other end, into the bore of the cylinder 66 between said chamber 72 and the chamber 74 so that it is obstructed by the piston 67 when the piston unit 67–68 is in its mean position. Similarly, a second U-shaped duct 78 opens by one end into the bore of the cylinder 66 between the chambers 73 and 74 so that it is obstructed when the piston unit 67-68 is in its mean position, and by its other end, into the chamber 73. The piston unit 67-68 is maintained in its mean position by two springs 79-80 at each side of said piston unit 67-68. In this way, the chamber 74 and the container H have no communication with the chambers 72 and 73, when the piston unit 67-68 is in its mean position.

Two ports 81 and 82 of the cylinder 66 open respectively into the ducts 77 and 78. A branch 83 of the pipe 32 is connected to the port 81 and a branch 59 of the pipe 30 is connected to the port 82. Thus, the chamber 73 is in communication with the delivery pipe 30 while the chamber 72 is in communication with the return pipe 32. The piston unit 67-68 will thus be shifted to one or the other side of the cylinder 66 by the predominant fluid pressure in one or the other of the pipes 30 and 32, thereby opening the communication between the chamber 74 and the container H, and the pipe opposite to that wherein the fluid pressure is predominant, so that the fluid from the container H will be allowed to pass within the hydraulic circuit of the assembly always on the suction side.

The mechanism (not shown in the drawing), which operates the piston 35 of the device F, may be a governor driven together with the pump, or, for instance, when the pump is driven by a combustion engine, as in the case of a motor vehicle, said mechanism may be a well known vacuum cylinder connected to the engine manifold. Said vacuum cylinder may operate the piston 35 through a direct link connection between its diaphragm and said piston, or with the assistance of any well known servo-mechanism. The kind of mechanism suited for operating the piston 35 does not affect the substance of this invention. Further, provision may be made for sealings between pistons and rods, and the bores in which they are shiftable without affecting the substance of this invention.

The invention comprises further two well known valve devices 84 and 85, arranged between the branch 59 of the delivery pipe 30 and the return pipe 32. The valve device 84 opens the flow of fluid from said branch 59 into said pipe 32, when the fluid pressure in said branch 59 exceeds that of the pipe 32 by a predetermined amount. The same work is done in just the same circumstances by the valve device 85 in the opposite direction from the pipe 32 to the branch 59.

The transmission assembly works as follows.

At rest, the pump A is also at rest and the piston units 3-5 and 15-16 are urged by the springs 10 and 23 against the stops 11 and 34 respectively. If the piston unit 45-46 of the distributor device C is in its mean position, the pump A and the hydraulic motor B are each shunted and the transmission assembly is idle. The hydraulic motor B is free to rotate when acted upon by some external torque, in one or the opposite direction, and similarly, the pump A can turn without driving the hydraulic motor B.

If the piston unit 45-46 is shifted to one end of the cylinder 43, a communication between the pump A and the hydraulic motor B is established with the exclusion of any short-circuiting, and, at rest, the transmission is locked by the pump A, whose control member 1 is kept by the spring 10 in the position 1/A so that there is no delivery of the pump. In this case, however, any torque imposed on the hydraulic motor B, will stimulate a rise in the fluid pressure of the return pipe 32, which will shift the pistons 16 and 5 against the springs 23 and 10 respectively, moving the control member 1 to a position in which a certain amount of flow from the pump A will be allowed, and communication between the chambers 40 and 22 with the chamber 12 will be opened. This would cause the pump A to start turning by the action of the torque imposed on the hydraulic motor B and the fluid pressure differential between the pipes 30 and 32. But, the pump A, reacting on the engine that drives it, maintains the transmission locked. If the prime mover which drives the pump A is reversible, provision must be made for braking the pump when it is urged to turn by a torque imposed on the hydraulic motor B. If the torque imposed on the hydraulic motor is such that the pressure rises inside the pipe 30, as for instance, when the hydraulic motor B is urged into backward rotation, the transmission arrangement also remains locked, because the pressure of said pipe 30 will be admitted through the chamber 20, the branch 27, the duct 26 and the chamber 12, to urge the piston 3 against the stop 11, so that the control member 1 of the pump will be kept in the position 1/A where the delivery of the pump is zero so that there cannot be any open exhaust for any flow of pressure fluid from the hydraulic motor through the pump, and therefore the pump cannot turn.

Starting the rotation of the pump A with the piston unit 45-46 at one end of the cylinder 44, and the piston units 3-5 and 15-16 at the stops 11 and 24 respectively, the fluid pressure in the delivery pipe 30 will rise, urging said piston units 15-16 and 3-5 towards said stops 24 and 11 respectively, while the piston 35 will be urged towards the cylinder head 36 of the cylinder 34 in accordance with the increasing speed of the pump A, forcing pressure fluid into the chamber 13 and shifting the piston 5 against the spring 10 and against the fluid pressure of the delivery pipe 30, until a position will be reached, where said counteracting spring and fluid pressures from the delivery pipe, and from the cylinder 34 will be in balance and the delivery of the pump A adjusted for starting the hydraulic motor B against the load opposing its motion.

It is clear that said position of balance of the piston unit 3-5 will change in dependence upon the changes in the fluid pressure of the delivery pipe 30, and also depending on the changes in the load on the hydraulic motor B, and in dependence upon the fluid pressure forced by the piston 35, itself depending on the turning speed of the pump A. If the load acting on the hydraulic motor B drives the pump A, as happens for instance, in a motor vehicle when running down hill, or when braked by the engine, the fluid pressure prevailing in the return pipe 32, will shift the piston 5 towards the position 1/B, increasing the delivery of the pump A, while the piston unit 15-16 reverses the action of the piston 35 on the piston unit 3-5, thus bringing said piston unit to a new position of balance wherein the delivery of the pump A will regulate the speed of the hydraulic motor B in dependence upon the load acting on said hydraulic motor B and in dependence upon the speed at which the pump A is allowed to turn, by the prime mover with which it is coupled.

The transmission ratio is thus automatically adapted to the load acting on the output shaft of the hydraulic motor B, and to the speed of the input shaft of the pump A, and this automatic control is evident in the normal mode from the pump A to the hydraulic motor B, as in the reverse mode from the hydraulic motor B to the pump A, so that reversibility of the transmission is guaranteed. The change of the transmission ratio is operated in direct drive, as well as in reverse.

The valve devices 84, 85 ensure discharge of any excess pressures between the pipes 30 and 32 in both senses, from 30 into 32 or vice-versa, in accordance with which of said pipes sustains the excess pressure.

I claim:

1. A reversible hydraulic transmission assembly with a self-changing transmission ratio, comprising
    a hydraulic motor, a variable delivery pump for supplying a pressure fluid to said hydraulic motor, a hand-operable distributor device for directing said pressure fluid to said hydraulic motor so that the transmission is selectively settable in drive, neutral or reverse operating state, pipe connections for the flow of the pressure fluid between said hydraulic motor, said distributor device and said pump, a double-acting cylinder arrangement for displacing a control member of said pump whereby the rate of delivery of the pump and consequently the transmission ratio is changed, said cylinder arrangement being operated by the pressure fluid supplied by the pump when said pump tends to speed up in respect to the hydraulic motor, and by the pressure fluid returned from said hydraulic motor to said pump when the pump tends to slow down in respect to said motor so that the transmission is reversible, the transmitted motion remaining unaffected when the drive from the pump to the hydraulic motor switches from said motor to the pump, a second distributor device operated alternatively by the pressure fluid issuing from said pump, or returning to the pump from the hydraulic motor for admitting said pressure fluid to said cylinder arrangement and for admitting a second pressure fluid to said cylinder arrangement in opposition to said pressure fluid issuing from said pump or returning to said pump, pipe connections for the flow of said pressure fluid from said pump and said hydraulic motor to said second distributor device and ducts for the flow of said pressure fluid from said distributor device to said double-acting cylinder arrangement, a cylinder with a single-acting piston operated in dependence upon the pump speed for forcing said second pressure fluid into said double-acting cylinder arrangement through said second distributor device so that the position of said control member of the pump always corresponds to that at which said fluid pressure from said pump or from the hydraulic motor and from said single-acting cylinder are in balance with each other and consequently the transmission ratio is in accordance with the load and with the speed of the pump, and a pipe connection for the flow of said second pressure fluid between said single-acting cylinder and said second distributor device.

2. A reversible hydraulic transmission assembly as defined in claim 1, further comprising
a container for the pressure fluid, a third distributor device operated by said pressure fluid from said pump or from said hydraulic motor respectively when said pump tends to speed up or slow down in respect to said hydraulic motor, for admitting fluid from said container into that of said pipe connections for the flow of fluid from and to the pump, which is relieved of pressure, and a pipe connection between said container and said single-acting cylinder for admitting fluid from said container into said single acting cylinder, when the piston of said single-acting cylinder is at the outer end of its stroke.

3. A reversible hydraulic transmission assembly as defined in claim 1, further comprising valve arrangements between said pipe connections for the flow of fluid from and to the pump for preventing excess pressures in the latter pipe connections and the balance of the hydraulic assembly.

4. A reversible hydraulic transmission assembly as defined in claim 1, wherein said hand-operated distributor device comprises a cylinder with a unit of two pistons fastened to a rod at a distance from each other, said rod projecting with one of its ends outside said cylinder, two cylinder heads one at each end of said cylinder, a hole formed in one of said cylinder heads to allow said end of said rod to project outside said cylinder, a first chamber defined between said cylinder head with said hole and one of said pistons on said rod, a second chamber defined between said cylinder head opposite to said first chamber and the other of said pistons on said rod, an intermediate chamber defined between said pistons on said rod, a duct connecting for intercommunication said opposite chambers and a port opening in said duct; said port being in communication through one of said pipe connections with one of a pair of delivery and return pipes of said pump, a port in said intermediate chamber connected for communication through another of said pipe connections to the other of said delivery or return pipes, two ducts opening each with its respective ends respectively at each side of each of said pistons for connecting each of said chambers between each piston and the respective cylinder head with said intermediate chamber, a port opening into one of said ducts and a second port opening in the other of said ducts, said ports being in communication through respective pipes of said pipe connections one with the entrance of pressure fluid into, and the other, with the exhaust of said pressure fluid from said hydraulic motor.

5. A reversible hydraulic transmission assembly as defined in claim 1, wherein said double-acting cylinder arrangement comprises two cylinders, a double-acting piston unit therein, a rod fastened to said double-acting piston unit and means including said rod for engaging a free end of said control member of said pump, for moving said control member between one end position where no flow of pressure fluid is delivered by said pump and a second end position where a maximum flow of said pressure fluid is delivered by said pump, and any intermediate amount of flow is delivered by said pump at any intermediate position of said double-acting piston unit and of said control member, two cylinder heads respectively one for each of said cylinders, two chambers between said cylinder heads and said double-acting piston unit respectively one at each side of said piston unit, and a spring for urging said piston unit towards the end position where there is no flow of pressure fluid delivered by the pump, said double-acting cylinder arrangement being associated with a second distributor device comprising a cylinder bore with two pistons fixed to an intermediate rod and forming a unit, two cylinder heads to close the ends of said cylinder bore, a first and a second chamber at each side of said piston unit between said piston unit and each cylinder head, a third chamber between said two pistons of said unit, a spring urging said piston unit against the cylinder head closing said second chamber, a first duct extending from a point of said cylinder bore of said second distributor device where it is obstructed by said piston of said piston unit on the side of said first chamber of said second distributor device when said piston unit is at the end of said cylinder bore opposite to said first chamber, of said second distributor to said first chamber of said double-acting cylinder arrangement, a branch of said duct communicating with said first chamber of said second distributor device, a second duct extending between said third chamber of the second distributor device and said second chamber of the double acting cylinder arrangement when said piston unit of said second distributor device is at said position, a branch of said second duct communicating with said cylinder bore of said second distributor device at a point where said branch is obstructed by the other piston of said piston unit of said second distributor in the said position of said piston unit, and a port opening into said third chamber of said second distributor device.

6. A reversible hydraulic transmission assembly as defined in claim 2, wherein said single cylinder with a single-acting piston and said third chamber of said second distributor device are in communication through said pipe connection for the flow of said second pressure fluid between said single-acting cylinder and said second distributor device and said pipe connection between said container and said single-acting cylinder opens into a port of said single-acting cylinder just below said single-acting piston when said piston is at the outer end of its stroke so that it is closed soon after said single-acting piston starts moving towards the inner end of its stroke.

7. A reversible hydraulic transmission assembly as defined in claim 2 wherein said third distributor device comprises a cylinder with a unit of two pistons fixed at the ends of an intermediate rod, two cylinder heads for closing the ends of said cylinder of said third device, one chamber at each end of said cylinder and one chamber between said pistons of said piston unit, a port between said chamber between said pistons communicating through a pipe connection with said container, springs at each side of said piston unit, for maintaining said piston unit in its mean position, a duct between one chamber at one end of said cylinder and a point of the bore of said cylinder where it is obstructed by the piston of said unit which is adjacent to said one chamber, a port from said duct connected to a branch pipe of said delivery pipe of said pump, a second duct between the other chamber at the end of said cylinder and a point of the bore of said cylinder, where it is obstructed by the other of said pistons of said piston unit in its mean position, and a port from said second duct connected to a branch of said return pipe from said hydraulic motor to said pump.

References Cited by the Examiner
UNITED STATES PATENTS

| | | | |
|---|---|---|---|
| 2,516,662 | 7/1950 | Vickers et al. | 60—52 |
| 3,117,420 | 1/1964 | Young | 60—53 X |
| 3,139,723 | 7/1964 | Holldwell | 60—52 X |

EDGAR W. GEOGHEGAN, *Primary Examiner.*